United States Patent [19]

Meyer

[11] 4,309,389
[45] Jan. 5, 1982

[54] PROCESS FOR THE RECOVERY OF HYDROFLUORIC ACID AND DEPOSITABLE RESIDUES DURING TREATMENT OF NIOBIUM- AND/OR TANTALUM-CONTAINING RAW MATERIALS

[75] Inventor: Horst Meyer, Goslar, Fed. Rep. of Germany

[73] Assignee: Hermann C. Starck Berlin, Berlin, Fed. Rep. of Germany

[21] Appl. No.: 164,865

[22] Filed: Jul. 1, 1980

[30] Foreign Application Priority Data

Jul. 10, 1979 [DE] Fed. Rep. of Germany ....... 2927835

[51] Int. Cl.$^3$ ...................... C01G 33/00; C01G 35/00
[52] U.S. Cl. ....................................... 423/63; 423/62; 423/64; 423/484; 75/101 BE; 75/121
[58] Field of Search ...................... 423/62, 65, 63, 66; 75/121, 101 BE

[56] References Cited

U.S. PATENT DOCUMENTS

| 2,816,815 | 12/1957 | Ruhoff et al. | 423/62 |
| 2,950,966 | 8/1966 | Foos | 423/63 |
| 3,117,833 | 1/1964 | Pierret | 423/63 |
| 3,972,710 | 8/1976 | Meyer | 75/121 |
| 4,065,405 | 12/1977 | Hulme | 423/63 |
| 4,164,417 | 8/1979 | Gustison | 423/62 |

*Primary Examiner*—Herbert T. Carter
*Attorney, Agent, or Firm*—Ladas & Parry

[57] ABSTRACT

Raw materials containing tantalum or niobium are treated to obtain aqueous solutions containing fluoroacid complexes of niobium or tantalum. These solutions are decomposed by pyrolysis and calcined to obtain pure oxides of niobium or tantalum. The hydrofluoric acid separated during pyrohydrolysis is recovered and reused. A niobium or tantalum-free raffinate solution obtained, on extraction, with the above aqueous solutions contains dissolved metalloids which are recovered as oxides which are deposable waste products.

6 Claims, No Drawings

PROCESS FOR THE RECOVERY OF HYDROFLUORIC ACID AND DEPOSITABLE RESIDUES DURING TREATMENT OF NIOBIUM- AND/OR TANTALUM-CONTAINING RAW MATERIALS

The invention relates to a process for treating tantalum-niobium raw materials such as tantalum-niobium-containing residues, slags, concentrates and ores, and specifically to the recovery of hydrofluoric acid, which is employed in said process, and to its recycling into the process, at the same time taking particular account of environmental protection by eliminating harmful waste materials.

It is known to recover tantalum- and niobium-containing raw materials, for example, ores, slags and concentrates produced therefrom or residues of any origin by chemical and/or metallurgical processes.

According to the known chemical processes in which tantalum- and niobium-containing residues are dissolved in mineral acids, respectively by adding hydrofluoric acid and heat treating at the same time, there are obtained solutions, which contain niobium and tantalum in the form of their complex fluoroacids, and are burdened by gangue and other impurities. The selective separation of the tantalum- and niobium-fluoro-components also takes place in a manner known per se by multi-stage liquid-liquid-extraction, during which simultaneously, while re-extracting from the organic phase, the separation of the complex tantalum- and niobium-fluoroacids is achieved by selecting a suitable hydrofluoric acid concentration in the aqueous phase. Such processes, for example, are described in U.S. Pat. Nos. 3,117,833, 2,953,453 and 2,950,966.

Proceeding from the pure aqueous solutions of the complex tantalum- or niobium-fluoroacids, being recovered in a manner known per se, it has been customary till now to obtain tantalum or niobium as oxides in pure form by precipitating them from the aqueous solutions as fluoride-containing tantalum- or niobium-oxide-hydrate by adding ammonia, and by converting the thus recovered oxide hydrates to pure oxides by calcining at higher temperatures. Naturally, products manufactured in such a manner are characterized by relatively low bulk densities due to their porosity, this very often being disadvantageous when storing, transporting, handling and processing.

Naturally, large amounts of waste waters containing ammonium fluoride accumulate in this known process, which either leads to environmental contamination or requires special steps in order, on the one hand, to recover ammonia by reaction with calcined lime, and, on the other hand, to deposit the fluoride in harmless form as a deposable fluorite slurry.

In the present invention the customary hydrolytic-precipitation of the niobium- and tantalum-hydrate acids from the hydrofluoric solutions of niobium and tantalum by means of ammonia with all its disadvantages is avoided, and at the same time hydrofluoric acid is recovered in its pure, reusable form. Said hydrofluoric acid may be recycled into the dissolution and separation process.

A useful and inexpensive process for eliminating the outlined difficulties has been achieved in that (a) the aqueous solutions of the complex fluoroacids of niobium and tantalum, which, as is well known, are recovered from the organic phase by re-extraction, and which additionally contain free hydrofluoric acid, and (b) the tantalum- and niobium-free raffinate remaining after the liquid-liquid-extraction together with the metalloids, having been brought in as impurities, and the remaining free hydrofluoric acid comprised therein are decomposed by pyrohydrolysis within a temperature range of from 60°–600° C., the hydrofluoric acid being condensed thereby, and in this way being recovered in its pure, reapplicable form in amounts from 1 to 80% by weight, specifically from 35–70% by weight.

Particularly, when being heated, fluorotantalum- and niobium-acid solutions decompose hydrolytically through the reaction with water, forming free hydrofluoric acid and a tantalum- or niobium-oxide hydrate. The thermal decomposition of complex fluoroacids in the presence of water proceeds over single intermediate stages, the fluoro-components being more and more replaced by hydroxide and the resulting hydrogen fluoride being distilled off as a volatile constituent (see Example 1c). The temperature for the beginning of the pyrohydrolytic decomposition of the complex fluoroacids may, of course, be advantageously lowered by working under reduced pressure in the vacuum evaporator. In doing so, the boiling point of the released hydrofluoric acid is noticeably lowered (see Example 1d). The pyrohydrolysis proceeds with an increasing temperature so that the resulting tantalum- or niobium-hydrate acids are finally converted to pure oxides of tantalum or niobium under the separation of water.

After the pyrohydrolysis stage mentioned under (a), one arrives at the pure oxides of the tantalum or niobium elements through calcination at temperatures of about 600° to 1,500° C., preferably from 800° to 1000° C. Said pure oxides may be employed as raw materials for the preparation of tantalum or niobium compounds.

Besides, the oxides of niobium and tantalum which have been prepared according to the process of the invention, are advantageously distinguished by particularly high bulk densities, which have been measured twice as high as those of the products prepared according to conventional precipitation methods. Thus, according to conventional precipitation processes, products are obtained which have bulk densities of from 0.5 to 1 g/cm$^3$, whereas the products produced by pyrohydrolysis according to the invention have bulk densities of from 1 to 2 g/cm$^3$.

The pyrohydrolysis stage mentioned under (b) together with the following calcination at temperatures of about 900°0 to 1400° C. leads to oxides of metalloids such as, for example, iron, titanium, aluminum, zinc, zirconium, manganese, silicon, etc., this being achieved by first ejecting free hydrofluoric acid and fluorides, and at increasing temperatures also sulfuric acid. As is well known, the separation of $SO_3$ from the remaining metal sulfates is achieved only during calcination of the sulfates at temperatures above 900° C. Thus, in addition to hydrofluoric acid, it is also possible to recover sulfuric acid from the raffinate solutions mentioned under (b). Said sulfuric acid may be re-employed for the raw materials in the dissolution process. The quantitative relationship of the hydrofluoric acid and the sulfuric acid recovered thereby depends, of course, on the mixture ratio of said acids, which must be used for the primary treatment of the employed tantalum-niobium-raw materials. Said acid quantities are widely variable. The quantities mentioned in Example 1a are only advantageous for the exemplary selected raw material, they should by no means restrict the quantitative relationship.

The oxides of the metalloids obtained by calcination are insoluble in water, and, therefore, they may be deposited as waste products without any damage to the environment.

In comparison to the conventional wet-chemical processes (precipitation with ammonia) there are no more ammonium- or fluorine-containing waste waters apparent in the process according to the invention.

EXAMPLE (a)

1 ton of a tantalum-niobium-ore cotaining 33.9% of $Ta_2O_5$, 39.3% of $Nb_2O_5$, 0.9% of $TiO_2$, the remainder being other impurities, was decomposed in a mixture of 1100 liters of a 70 percent hydrofluoric acid, 700 liters of concentrated sulfuric acid and 2000 liters of water by heating with live steam. After dissolution the acid solution was filtered off from insoluble residues.

The thus obtained clear solution was subjected to a multi-stage liquid-liquid-extraction according to known methods (for example, U.S. Pat. No. 3,117,833), in the course of which there was simultaneously obtained a separation of the tantalum and niobium components as complex fluoroacids in aqueous solution. Three aqueous solutions resulted therefrom:

(1) about 6700 liters of a fluorated tantalum solution with 48.8 g/l $Ta_2O_5$ (corresponding to a Ta yield of about 96%);

(2) about 7200 liters of a fluorated niobium solution with 52.8 g/l $Nb_2O_5$ (corresponding to a Nb yield of about 97%);

(3) a fully extracted raffinate solution with the dissolved metalloids (impurities) with residual free hydrofluoric acid and sulfuric acid.

Said solutions were subsequently treated in the following way:

(b)

Prior to the actual subsequent pyrohydrolytic treatment according to the invention both the tantalum-solution (about 6700 liters according to 1.) and the niobium-solution (about 7200 liters according to 2.), separated for the time being, were concentrated to from 1/7 to about 1/10 of their volume by evaporation in a vacuum evaporator at 50° C. The condensate, essentially obtained as water in said pre-evaporation, contained only a relatively small amount of the recovered hydrofluoric acid (about 160 kg HF) with a hydrogen fluoride content of about 14 grams per liter. On the one hand, said condensate was employed as a solvent instead of water, and, on the other hand, it was employed as a suitably diluted hydrofluoric acid in the re-extraction of niobium in the course of the liquid-liquid-extraction.

(c)

In order to illustrate that during the process of distillation the pyrohydrolytic decomposition of the complex fluoroacids proceeds with an increasing temperature, the solution concentrated according to Example (b) has been partly used for the following test. Thereby there is observed an increasing concentration of the set free hydrofluoric acid, whereas the water content of the distillate decreases in favor of the quantity of water necessary for the hydrolytic decomposition of the fluoro-complexes. The decomposition products are removed from the solution as solid matter.

For that purpose 1000 ml of the niobium solution, evaporated according to Exampe (b), and having a density of 1.82 g/cm$^3$, were subjected to distillation at from 120° to 180° C. The decomposition reaction procedure was examined by repeatedly changing the condensation product receiver and by determining the hydrogen fluoride in the condensate.

The following was obtained in the condensate:

(1) a 165 ml solution with 21% HF (at about 120°–140° C.)

(2) a 165 ml solution with 32% HF (at about 140°–160° C.)

(3) a 165 ml solution with 59% HF (at about 160°–170° C.)

(4) a 100 ml solution with 70% HF (at about 170°–180° C.).

360 ml remained in the still as sump from which 720 grams of solids had been precipitated and separated from the mother liquor by filtration. The remaining residual liquid (mother liquor) with regard to density and content nearly corresponded to the employed starting solution. Therefore, it was again added to the following new charge.

The filtered off solid matter, consisting of fluoro-containing niobium oxide hydrate, was for the purpose of the following calcination further heated in a muffle furnace up to about 1000° C., and thereupon it produced about 350 grams of pure niobium oxide.

(d)

The tantalum solution (about 690 liters), which had been re-concentrated according to Example (b), having a 385 g/l tantalum content and up to 250 g/l of fluorine, was pyrohydrolytically decomposed in a vacuum evaporator at a temperature range from about 60° to about 120° C., the obtained condensation product being 640 liters of hydrofluoric acid (about 30 percent by weight), and the wet residue being 481 kilograms of solid matter. Said solid matter essentially consisted of a tantalum-oxygen-compound still containing 8.1% of fluorine and little water. The residual fluorine with the water were ejected from said still wet, impure (crude) tantalum oxide at about 800° to 900° C. by calcination in a fluidized bed furnace, and condensed as hydrofluoric acid. The final tantalum product consists of $Ta_2O_5$, having a 99.5% $Ta_2O_5$ purity. The thus produced tantalum oxide exhibited in an unexpected manner a bulk density which was twice as large as that of the oxide having been produced in a customary manner by wet chemical processes ($NH_3$-precipitation). When measured according to Scott's method, the bulk density of the product according to the invention was 1.6 g/cm$^3$.

(e)

In connection with the treatment of a niobium solution it will be further shown that other possibilities pertaining to an apparatus and to changed parameters do not limit the process. For this reason the fluoro-containing niobium solution (according to Example (b)) was dissociated in a spray dryer with a starting temperature of from 300° to 350° C. The exhaust gases were condensed or scrubbed in a scrubbing tower. 481 kilograms of solid matter with combined (hydrate-) water and only small amounts of fluorine as well as about 700 liters of hydrofluric acid with an HF content of nearly 40 percent by weight as a condensate resulted from about 740 liters of the niobium solution with 350 g/l of niobium. The solid matter containing hydrate water was converted to pure $Nb_2O_5$ by the following calcination, 376 kg of $Nb_2O_5$ being obtained as the product with a purity of 99.95%. Also the niobium oxide, which had been prepared according to the invention, exhibited a surprisingly high bulk density, which analogously to $Ta_2O_5$ was about twice as high as that measured by customary methods according to conventional processes (ammonia precipitation and calcination). The determination of the bulk density according to SCOTT resulted for $Nb_2O_5$—in the process according to the invention—in 1.7 $g/cm^3$, whereas $Nb_2O_5$ produced according to conventional processes has bulk densities of only 0.5 to 1.0 $g/cm^3$.

The total hydrofluoric acid amount obtained in the Example was sufficiently pure in order to be employed for the dissolution of the following ore-load.

(f)

3100 liters of the tantalum-free and niobium-free fully extracted raffinate solution, which in addition to the dissolved salts of the metalloids (impurities) also contained free sulfuric acid and hydrofluoric acid, was sprayed into a free gas flame in a reactor at temperatures of about 1000° to 1200° C. The exhaust gases of said reaction produced a mixture of an aqueous solution of sulfuric acid and hydrofluoric acid as a condensate. The solid matter formed in the hot flame and on the walls of the reactor during pyrolysis or calcination consisted of oxides of titanium, zirconium, iron, aluminum and manganese, and was substantially free from harmful fluoro-components and soluble sulfates. A test on deposition ability, in which one part of the oxide mixture was agitated with two parts of distilled water for several hours, resulted in that the waste product could be settled out harmlessly.

The acid mixture recovered by condensation was again employed in a wet chemical treatment of a succeeding ore-load.

I claim:

1. In a process for treating tantalum- and/or niobium-containing raw materials by dissolving them in hydrofluoric acid and sulfuric acid mixtures, separating the niobium and tantalum elements by liquid-liquid-extraction, and subsequently re-extracting said elements as complex fluoroacids from the organic phase in aqueous solutions, the improvement which comprises (a) decomposing said obtained aqueous solutions containing fluoroacid complexes of niobium and/or tantalum and small amounts of free hydrofluoric acid by pyrohydrolysis within a temperature range of from 60° to 600° C., calcinating within a temperature range of from 600° to 1500° C., converting the complex fluoroacids of niobium and/or tantalum to pure oxides of niobium and/or tantalum, and recovering the hydrofluoric acid separated during pyrohydrolysis in its pure reusable form with a hydrogen fluoride content of from 1 to 80 percent by weight, by condensation or scrubbing of the exhaust gas, and (b) decomposing by pyrohydrolysis extracted niobium- and/or tantalum-free raffinate solution comprising dissolved metalloids as well as still free sulfuric acid and hydrofluoric acid in the mixture, and calcinating, recovering the hydrofluoric acid and the sulfuric acid as a condensate in a reusable mixture, and recovering the metalloids as oxides not comprising water-soluble constituents as deposable waste products.

2. A process according to claim 1 wherein prior to the pyrohydrolytic decomposition in process step (a) the aqueous solutions of the complex fluoroacids of niobium and/or tantalum are concentrated by evaporation to from 1/7 to 1/10 of their volume in order to achieve a niobium- and/or tantalum-constituent concentration in the solution used for the pyrohydrolysis.

3. A process according to claim 1, wherein aqueous hydrofluoric acid recovered in process step (a) in amounts from 1 to 80 percent by weight is recycled into said dissolution and extraction processes.

4. A process according to claim 1, wherein said niobium- and tantalum-free raffinate solution is calcined by spraying in a free gas flame at temperatures of about 1,000° to 1,200° C.

5. A process according to claim 1, wherein the amount of hydrogen fluoride recovered in step (a) is from 35 to 70% by weight.

6. A process according to claim 1, wherein the calcination in step (a) is at 800° to 1000° C.

* * * * *